June 11, 1940.  O. B. HOLMQUIST, SR  2,204,310

VALVE PACKING GLAND

Filed March 29, 1938

Oscar B. Holmquist, Sr.
INVENTOR

BY Victor J. Evans & Co.
ATTORNEYS

Patented June 11, 1940

2,204,310

UNITED STATES PATENT OFFICE 2,204,310

VALVE PACKING GLAND

Oscar B. Holmquist, Sr., Amory, Miss.

Application March 29, 1938, Serial No. 198,781

5 Claims. (Cl. 286—27)

This invention relates to packing glands for throttle valves and other devices and more particularly to an attachment for an ordinary gland which will permit free movement of the valve stem with leakage of fluid about said stem reduced to a minimum. The invention has for the primary object the provision of an attachment which will take the place of a gland packing nut and will provide a medium for furnishing lubricant to the packing to keep the latter pliable and in a better condition to prevent leaks and will reduce wear to a minimum on the packing and to permit the packing to be successfully used with less pressure thereon and to offer less resistance to the movement of the valve stem.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation, partly in section, illustrating an attachment for a packing gland constructed in accordance with my invention.

Figure 1:
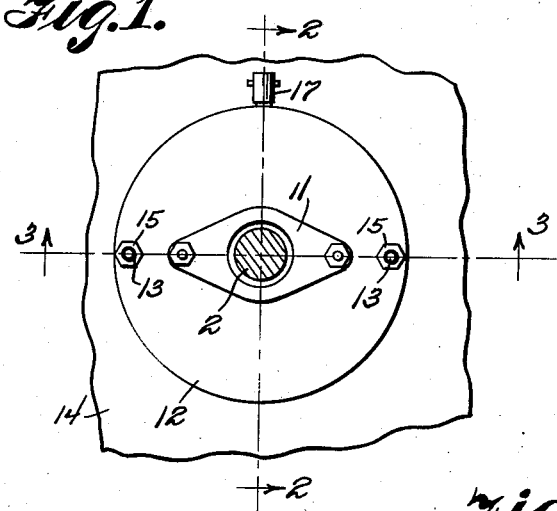
Figure 4:
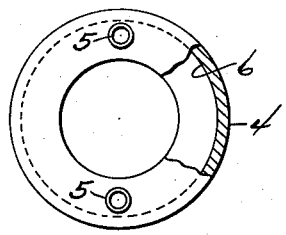
Figure 4 is a plan view, partly in section, showing a combined packing spacing collar and lubricant distributing medium.
Figure 2:
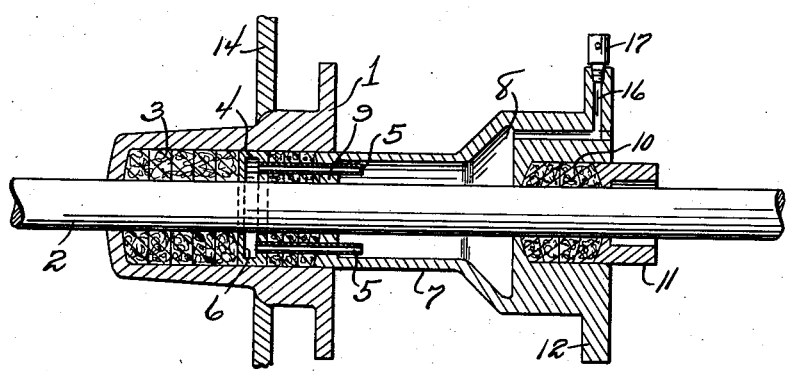
Figure 2 is a sectional view taken on line 2—2 of Figure 1.
Figure 3:
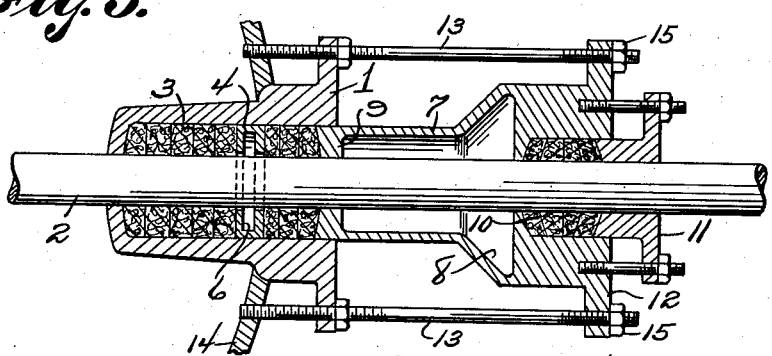
Figure 3 is a sectional view taken on line 3—3 of Figure 1.

Referring in detail to the drawing, the numeral 1 indicates a conventional type of packing gland in which the gland nut is omitted. 2 indicates a stem of a valve or similar device extending through the gland 1 for sliding movement and being engaged by packing 3 carried by the gland. In this instance, the packing 3 is shown arranged in groups separated by a combined spacing collar and lubricant distributing medium 4 loosely mounted on the stem 2 and having a tight slidable fit with the gland 1. Lubricant tubes 5 are connected with the chamber 6 of the combined spacing collar and lubricant distributing medium and extend outwardly of the gland 1. Engaging the packing and surrounding the stem is a hollow member 7 having a sliding fit with the gland 1 and which provides a lubricant chamber 8. One end of the member 7 has a wall 9 to engage the packing and slidably receive the stem and is provided with openings to loosely receive the lubricant tubes 5 to permit the latter to enter the lubricant chamber 8. The member 7 also carries packing 10 engaging the stem 2 and held in place by a nut 11. The member 7 is equipped with a flange 12 apertured to receive tie rods 13 which extend through apertures in the flange of the gland 1 and may thread into the member 14 to which the gland 1 is applied. The tie rods have screw threads and threaded on said tie rods are nuts 15 to engage with the flange 12 and the flange of the gland. The tie rods 13 permit the member 7 to be adjusted relative to the gland increasing and decreasing the pressure on the packing 3.

The member 7 is provided with a lubricant feed passage 16 to which is connected a lubricant fitting 17. By adapting an ordinary lubricant gun on the fitting 17 the chamber 8 may be easily filled with lubricant, the lubricant also passing through the tubes 5 into the chamber 6 of the combined spacing collar and lubricant distributing medium 4. The lubricant leaving the medium 4 will lubricate the packing 3 keeping the latter in a pliable condition and will reduce friction between the packing and the stem 2, consequently reducing wear on the packing to a minimum and aiding a free sliding movement of the stem in the gland.

What is claimed is:

1. In combination with a packing gland having packing and a valve stem extending through the gland and engaging the packing, a chambered member engageable with said packing and having a sliding fit with said gland, adjustable tie means between said member and the gland, means permitting lubricant to be forced into said member, a channeled collar arranged on the stem within the packing, tubes connected with said collar and extending into the chambered member to receive lubricant therefrom permitting said lubricant to lubricate the packing, and packing carried by said member to engage the stem.

2. The combination with a valve stem of a stuffing box carried by said stem, a lubricating collar having an inner annular recess slidably mounted within said stuffing box, packing disposed at either side of the said collar and adapted to be lubricated thereby, a packing gland having a tubular portion slidably mounted in said stuffing box and engageable with the said packing, tubular members carried by the said collar, communicating with the annular recess and projecting into the said packing gland to convey a lubricant from the gland to the collar, and means to introduce a lubricant into the said gland.

3. The combination with a valve stem of a stuffing box carried by said stem, a lubricating collar having an inner annular recess slidably mounted within said stuffing box, packing disposed at either side of the said collar and adapted to be lubricated thereby, a packing gland having a tubular portion slidably mounted in said stuffing box and engageable with the said packing, tubular members carried by the said collar, communicating with the annular recess and projecting into the said packing gland to convey a lubricant from the gland to the collar, means to introduce a lubricant into the said gland, and a packing gland carried by the stem and having a close frictional sliding engagement with the said first mentioned gland.

4. The combination with a valve stem of a stuffing box carried by the stem, packing within the said stuffing box, a collar having an inner annular recess slidably mounted within said stuffing box intermediate of the said packing and communicating therewith at either side thereof, a packing gland having a tubular portion terminating in a transverse closure wall slidable on the stem and received within the said stuffing box to vary the pressure on the packing, tubular members communicating at one end with the recess in the collar and with the opposite ends thereof slidably received in the transverse closure wall of the said packing gland and communicating therewith, and means to introduce a lubricant into the said gland.

5. The combination with a valve stem of a stuffing box carried by said stem, a lubricating collar having an inner annular recess slidably mounted within said stuffing box, packing disposed at either side of the said collar and adapted to be lubricated thereby, a packing gland having a tubular portion slidably mounted in said stuffing box and engageable with the said packing, tubular members carried by the said collar, communicating with the annular recess and projecting into the said packing gland to convey a lubricant from the gland to the collar, means to introduce a lubricant into the said gland, and adjustable tie means between the stuffing box and the said gland.

OSCAR B. HOLMQUIST, Sr.